United States Patent
Montipo

(10) Patent No.: US 7,637,508 B2
(45) Date of Patent: Dec. 29, 2009

(54) HIGH TEMPERATURE HIGH PRESSURE SEAL STACK HAVING RUN-DRY CAPABILITY

(75) Inventor: Fulvio Montipo, Reggio Emilia (IT)

(73) Assignee: Interpump Engineering S.R.L., Reggio Emilia (IT)

( * ) Notice: Subject to any disclaimer, the term of this patent is extended or adjusted under 35 U.S.C. 154(b) by 0 days.

(21) Appl. No.: 11/084,284

(22) Filed: Mar. 18, 2005

(65) Prior Publication Data

US 2005/0242513 A1    Nov. 3, 2005

Related U.S. Application Data

(60) Provisional application No. 60/554,596, filed on Mar. 19, 2004.

(51) Int. Cl.
F16J 15/18    (2006.01)
F16J 15/26    (2006.01)

(52) U.S. Cl. .................. 277/514; 277/500; 277/511; 277/603

(58) Field of Classification Search .............. 277/511, 277/510–512, 514–516, 540, 541, 585, 603
See application file for complete search history.

(56) References Cited

U.S. PATENT DOCUMENTS

| | | | | |
|---|---|---|---|---|
| 2,443,332 A | * | 6/1948 | Summers | 277/514 |
| 3,866,924 A | * | 2/1975 | French | 277/505 |
| 3,870,439 A | * | 3/1975 | Stachowiak et al. | 417/454 |
| 4,106,779 A | * | 8/1978 | Zabcik | 277/322 |
| 4,652,000 A | * | 3/1987 | O'Rourke | 277/474 |
| 5,306,021 A | * | 4/1994 | Morvant | 277/584 |
| 5,738,358 A | * | 4/1998 | Kalsi et al. | 277/544 |
| 5,755,372 A | * | 5/1998 | Cimbura, Sr. | 277/318 |
| 2003/0214100 A1 | * | 11/2003 | Pippert | 277/510 |

* cited by examiner

*Primary Examiner*—Jennifer H Gay
*Assistant Examiner*—Gilbert Y Lee
(74) *Attorney, Agent, or Firm*—Oppenheimer Wolff & Donnelly LLP

(57) ABSTRACT

A long life high pressure seal stack provides a reliable and efficient seal between a plunger and housing of a plunger type pump. The seal stack includes a high pressure sealing element and a low pressure sealing element, both of which provide a sealing extension which surrounds and is in contact with the plunger. The sealing extension is configured to be exposed to internal pressures within the valve, thus urging the sealing extension tighter against the plunger when pressures are high, while relaxing the sealing extension when pressures are low. By incorporating this variable pressure feature, the friction between the plunger and the seal is greatly reduced, especially during low pressure conditions. Further, the sealing elements are constructed of a low friction material, thus avoiding problems related to potential overheating of a seal element. Through the design of the sealing structure, and the selection of appropriate materials, a seal stack is created which has longer live and has dry run capabilities.

4 Claims, 3 Drawing Sheets

HIGH TEMPERATURE HIGH PRESSURE SEAL STACK HAVING RUN-DRY CAPABILITY

CROSS REFERENCE TO RELATED APPLICATIONS

This application claims the benefit of prior U.S. application Ser. No. 60/554,596, which was filed on Mar. 19, 2004.

BACKGROUND OF THE INVENTION

The present invention relates to a seal stack for use in a plunger-type positive displacement water pump that operates in high temperature/high pressure conditions. More specifically, the present invention relates to a seal stack that has longer life and better reliability than those currently available.

Plunger-type water pumps are positive displacement pumps that operate by a plunger reciprocating in a cylinder in such a manner that water is drawn into the cylinder on an upstroke of the plunger and water is forced out of the cylinder on a down stroke of the plunger. Pressure activated one-way valves define the ports through which the water ingresses and egresses from the cylinder. When pumping liquids such as water using a plunger pump, the desired high pressures are generated due to the incompressibility of the liquid.

In order to create the pressures desired, it is necessary to have efficient seals in the pump at all locations where leakage is a potential. One such location for potential leakage is the interface between the plunger and the housing walls. As mentioned above, high pressures are desired, thus the importance of the seal is magnified. To insure effective operation, high pressure seals must be used around the plunger to prevent water from leaking between the plunger and the cylinder walls. Typically, a seal stack is used such as that shown in FIG. 1, to provide this seal.

FIG. 1 shows a prior art seal stack made up of several components. At one end the first component of the seal stack is a head ring 1. The head ring 1 is a hard molded plastic such as polyacetal and has a male chevron shape. The function of this head ring will be explained after all of the various components are introduced. The next component is pressure packing 2. The pressure packing 2 is made of NBR with a rubber fabric base. It is shaped with a female chevron on one side and a male chevron on the opposite side. The female chevron is configured to mate with the male chevron of the head ring 1.

Next in the stack is a restop ring 3. Restop ring 3 is also shaped with a female chevron on one side and a male chevron on the opposite side, the female chevron being configured to mate with the male chevron of the pressure packing 2.

Next is the first brass component, intermediate ring 4. Intermediate ring 4 includes a female chevron, which is configured to mate with the male chevron of the restop ring 3. An upper side (as shown in FIG. 1) of the intermediate ring 4 has a flat surface. Leakage holes are formed in the side walls of the intermediate ring. These leakage holes are placed to feed any water that does seep past the pressure packing 2 back into the inlet.

The next component is a low pressure seal 5. The low pressure seal is constructed of HNBR which is a molded soft rubber. The low pressure seal 5 has a lower end having a plurality of raised flat surfaces that form channels therebetween. The flat surfaces abut the flat surface of the intermediate ring 4. The low pressure seal 5 has a ridge with a slight overhang on its upper side. This overhang provides a snap fit with the next component, a low pressure support packing 6. The low pressure support packing 6 has a groove configured to mate with the overhanging ridge to form a snap fit therebetween such that the low pressure seal 5 and the low pressure support packing 6 snap together to form one component.

The final component is a low pressure brass ring 7. The low pressure brass ring 7 includes a female chevron that completely receives the low pressure seal and the low pressure support packing such that, when assembled, the flat surfaces of low pressure seal 5 are nearly flush with the outer edge of the brass ring 7. The low pressure brass ring 7 also includes an O-ring around the outside of it to form a low pressure seal on the inside of the cylinder.

Once assembled the seal stack is placed on one end of a cylinder within a cylinder block. The plunger passes through the concentric openings on the center of each components making up the seal stack. The interior dimensions of the various openings are nearly identical with the internal diameter of the pressure packing 2 and the low pressure seal assembly being the smallest. Thus, the contact between the inside of the pressure packing 2 and the plunger form the seal. The rest of the components of the seal stack function to support this contact as outlined below.

In operation, the end of head ring 1 acts against a top ledge of the cylinder. This causes the male chevron of the head ring 1 to press into the female chevron of the pressure packing 2 providing support therefore. Support for the pressure packing 2 in the opposite direction is provided by the restop ring 3. The restop ring 3 acts as a cushion between the pressure packing 2 and the intermediate brass ring 4. Notably, not all manufacturers incorporate a restop ring 3. The intermediate ring 4 supports the seal and provides leakage holes to redirect any water that made its way past the high pressure packing 2 back into the inlet. The low pressure seal assembly 5 and 6 also act against the plunger. However, the pressures encountered by this assembly are not as great as those encountered by the pressure packing. The low pressure seal provides a backup seal against the plunger. The low pressure brass ring provides support for the low pressure seal assembly and also provides a rubber O-ring which seals the seal stack against the inside of the cylinder head (not shown).

The prior art seal stack works because the pressure packing 2 forms a tight fit against the plunger. However this can be problematic. The tight fit between the pressure packing 2 and the plunger requires constant contact with cool water to prevent the seal stack from overheating. When fluid is not present however, overheating problems exist. Thus this seal stack realistically has no run-dry capability. If the pump runs dry, the pressure packing quickly heats up causing the restop ring 3 to melt and the pressure seal 2 to deteriorate and fail.

In addition to the dry run problem mentioned above, the operating life of this seal stack is too short. During normal operations one can expect to get about 1,000 hours of useful life out of this seal stack. The pumps on which the seal stack are used are typically employed often suffer significantly if they are shut down to replace seal stacks. Thus, product life is very important. At the end of its useful life the pressure packing first begins to deteriorate, specifically, the NBR wears off of the fabric on the inside of the packing. Seal failure is then eminent.

The third problem encountered by this seal stack is that the seal stack does not have the capability to be used in high temperature operations. As explained above, the seal stack requires continuous contact with cool water. Obviously, operating the seal stack to pump high temperature water (>165° F.) results in a significant heating problems. This leads to a decreased life span, on the order of approximately 400 hours.

In light of the above issues related to seal stacks, it is the object of the present invention to provide a seal stack that has a run-dry capability. Such a seal stack will have the ability to avoid overheating problems that have plagued prior art seal stacks when run dry.

It is also an object of the present invention to provide a seal stack that has a longer life span. Longer life will reduce required maintenance by the user.

Yet another object of the present invention is to provide a seal stack that can be used in high temperature operations.

BRIEF SUMMARY OF THE INVENTION

The present invention relates to a high temperature/high pressure seal stack with a run-dry capability. The seal stack incorporates spring loaded seal surfaces that use water pressure to increase the effectiveness of the seal. Seal effectiveness is further enhanced by the shape of the seal area. The result is a looser allowable fit between the seal and the plunger. The spring loaded seals include a plurality of leaf springs wedged into a female chevron. During an upstroke of the plunger, a vacuum is created within the cylinder and the seals are allowed to relax decreasing the amount of friction between the plunger and seal. These features greatly increase the useful life of the seal.

Another feature of the seal stack of the present invention is that there are fewer components than the prior art seal stack. Whereas the prior art seal stack included seven separate components, the present invention includes only four separate components, two of which are brass and two of which are non-metallic. The reduced number of components significantly reduces the likelihood of failure of the seal stack. Additionally, the reduction of components simplifies manufacturing and potentially reduces costs related to seal replacement.

The four main components of the improved seal stack include a high pressure seal assembly, an intermediate ring, a low pressure seal, and a low pressure seal retainer. The high pressure seal assembly has an external O-ring that resides in a groove around a seal body, the O-ring being formed of an EPDM material which provides an increased temperature range. On the inside of the high pressure seal body is a female chevron structure that includes an internal energizer spring created from 302 stainless steel. This female chevron structure allows for the "relaxing" of the seal during an upstroke of the cylinder, as mentioned above. The configuration of the seal, and specifically the female chevron portion, causes the seal to "tighten" during a cylinder down stroke, thus increasing the sealing function when higher pressure is encountered. The seal itself is a mixture of PTFE (Teflon) and graphite. Graphite is included to provide low friction.

The second component of the improved seal assembly is a brass intermediate ring that includes two weepage holes to allow drainage back into the inlet. The intermediate ring is an improvement over the prior intermediate ring because it is a relatively straight forward component with a flat surface on one end thereby reducing production costs. Further, the opposite end of the brass intermediate ring is substantially flat with the exception of a protruding lip.

The next component is a low pressure seal that is also created from a mixture of PTFE and graphite. Again, these materials are chosen to reduce the amount of friction involved. The low pressure seal is also spring loaded and includes a rounded inner surface and a beveled outer surface. This structure is somewhat similar to the seal structure of the high pressure seal assembly in that it is allowed to relax during an upstroke of the plunger.

The final component of the improved seal stack is a brass low pressure seal retainer. The low pressure seal retainer has a flat bottom surface and an inner recess shaped to receive the low pressure seal. An inner surface of the seal retainer is slightly bell-shaped or conical to more easily receive the plunger during assembly. There is also an external groove size to receive an O-ring.

Once assembled, the four primary components (or assemblies) closely cooperate with one another to provide the required sealing. Additionally, through the seal design and/or material choices, overheating problems are greatly reduced. As a result, the seal stack is able to operate for a longer life, and is able to handle high temperature liquids.

BRIEF DESCRIPTION OF THE DRAWINGS

Further objects and advantages of the present invention can be seen from reading the following description, in conjunction with the drawings, in which.

DETAILED DESCRIPTION OF THE INVENTION

Figure 1:
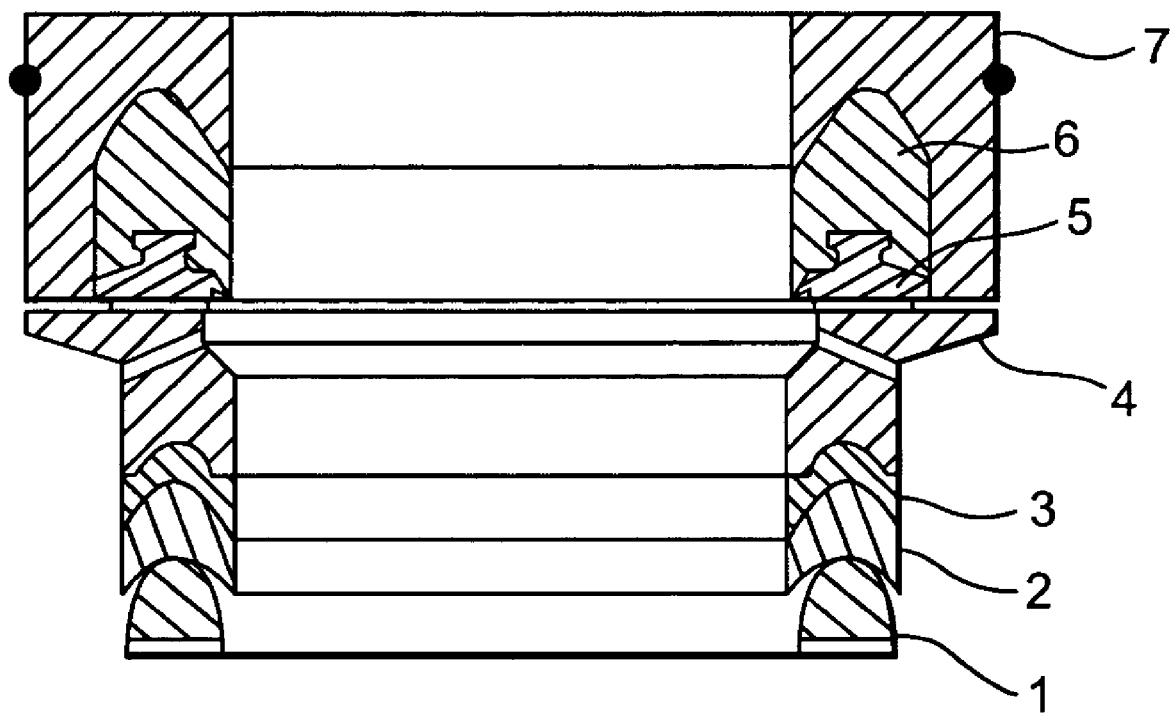
FIG. 1 is a cross-sectional elevation of the seal stack of the prior art.
Figure 2:
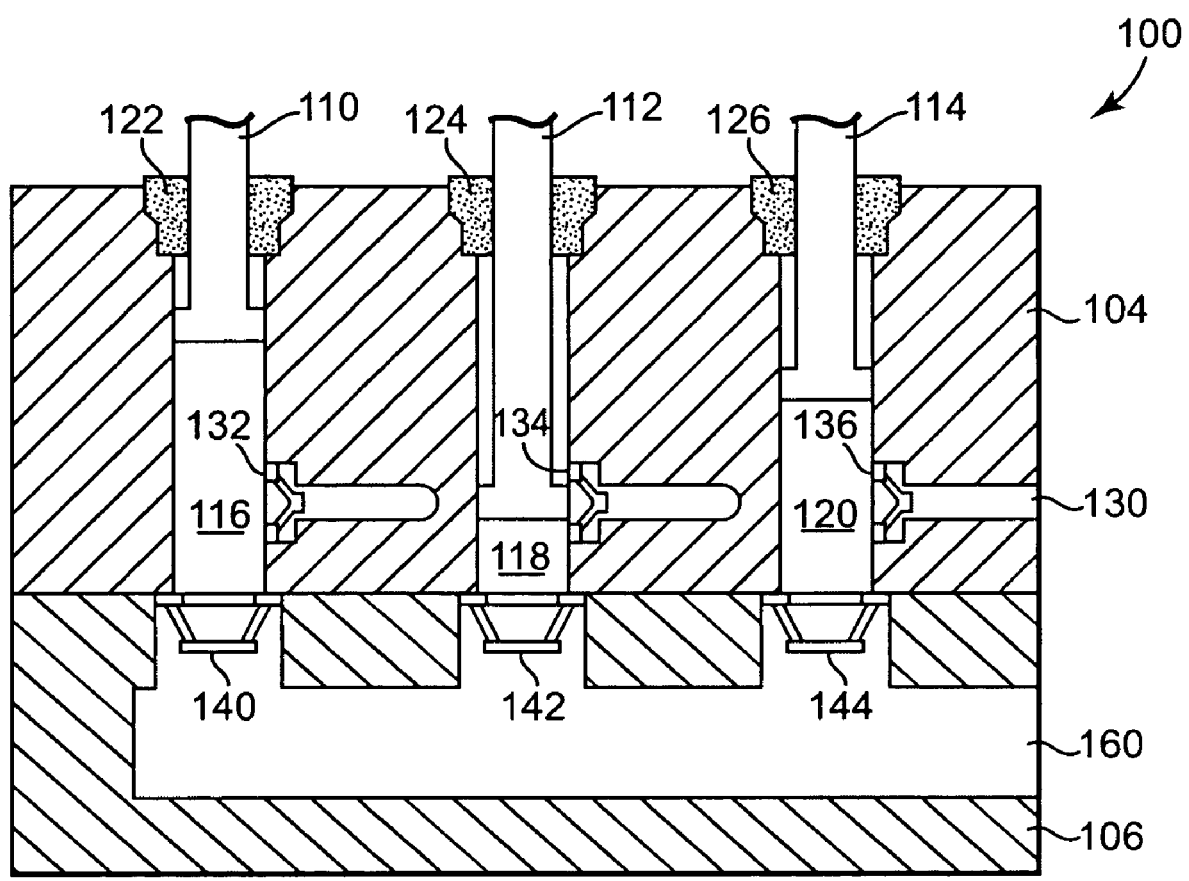
FIG. 2 is a schematic cross-sectional diagram illustrating the general components of a pump.

Referring now to FIG. 2, there is shown a general schematic diagram of a pump 100. As can be seen, pump 100 includes a pump housing 104 and an outlet manifold 106. in this particular embodiment, a first plunger 110, second plunger 112 and third plunger 114 are illustrated. As can be seen, each of these plungers extend within a first chamber 116, second chamber 118 and third chamber 120, respectively, and operate as described above to perform the high pressure pumping function contemplated by the present invention. Cooperating with each plunger (110, 112, 114) are a first seal stack 122, a second seal stack 124 and a third seal stack 126. Further details regarding the structure and operation of these seal stacks will be further discussed below.

As also generally discussed above, a pump has an inlet 130 for providing a supply of fluid, and a high pressure outlet 160 for providing the pressurized fluid to subsequent devices. Generally speaking, the housing is configured so that housing inlet 130 is in communication with first chamber 116, second chamber 118 and third chamber 120, so that fluid can be provided to each of these chambers. At the inlet for the particular chambers however are a first inlet valve 132, a second inlet valve 134 and a third inlet valve 136. Similarly, each chamber has an appropriate outlet valve. More specifically, within the pump embodiment illustrated in FIG. 2 is positioned a first outlet valve 140, second outlet valve 142 and third outlet valve 144. Generally speaking, both the inlet valves (132, 134, 136) and the outlet valves (140, 142, 144) are one-way pressure activated valves which operate to allow fluid to move one direction while prohibiting its movement in an opposite direction.

Generally speaking, as schematically illustrated in FIG. 2, fluid is provided at inlet 130 at a low pressure, and subsequently output at high pressure outlet 160. Naturally, the various components must carry out their required function to make this happen.

Figure 3:
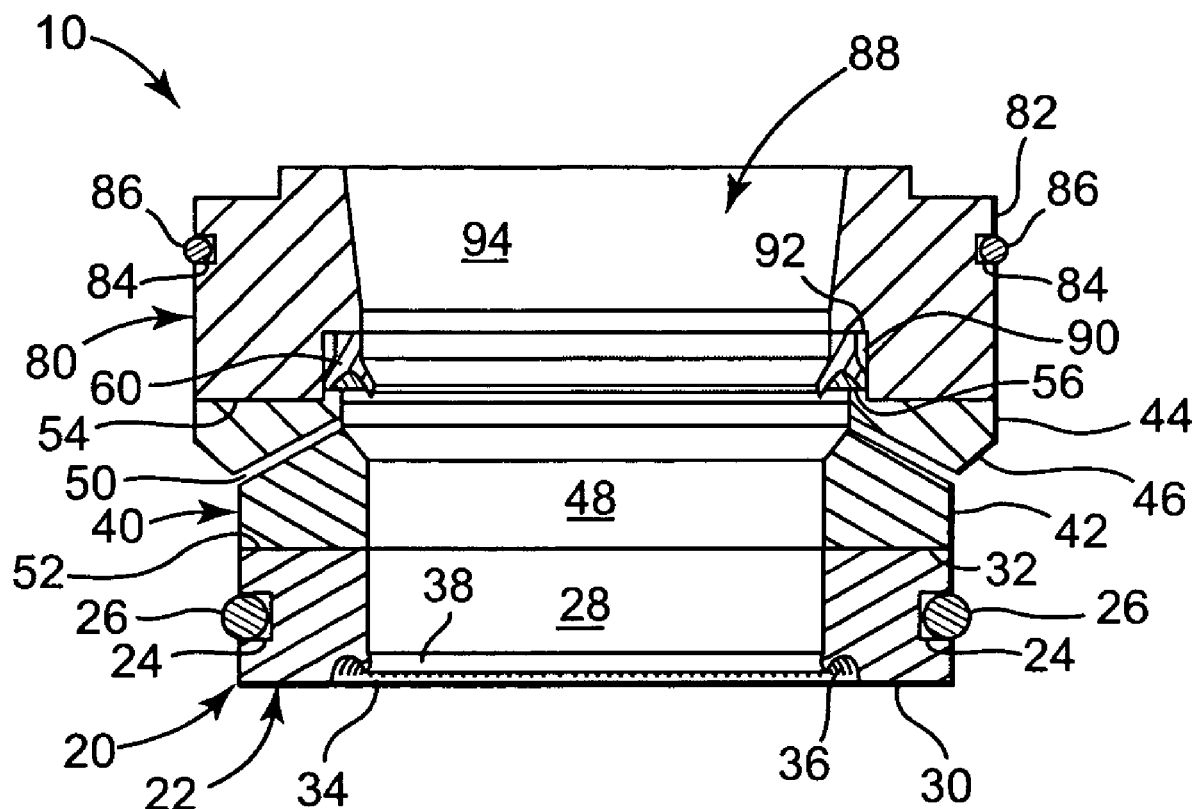
FIG. 3 is a cross-sectional elevation of the seal stack of the present invention; and, FIG. 4 is a cross-sectional elevation of the low pressure seal of the present invention.

Referring now to FIG. 3 there is shown and described herein a seal stack 10 of the present invention. The seal stack 10 generally includes a high pressure seal assembly 20, a brass intermediate ring 40, a low pressure seal 60, and a low pressure seal retainer 80.

The high pressure seal assembly 20 includes a body 22 that defines a groove 24 in its side to receive an O-ring 26. The body 22 further defines a cylindrical interior surface 28, a flat lower surface 30 and a flat upper surface 32 (references to "lower" and "upper" are relative to the orientation shown in FIG. 3). Formed into the interior surface 28 at the lower end of the body 22 is a female chevron structure 34 that houses an energizer spring 36. The energizer spring 36 is preferably formed of stainless steel, more preferably 302 stainless steel, and even more preferably comprises a plurality of small leaf springs formed either integrally or separately, and may be etched. An inward surface of the chevron structure 34 protrudes slightly past the interior surface 28 forming a rounded ridge 38. The rounded ridge 38 is specifically designed to contact a plunger (not shown) and forms the high pressure seal between those components.

The brass intermediate ring 40 is designed to be positioned immediately adjacent high pressure seal assembly 20 and includes a narrow lower portion 42, a wider upper portion 44, and a beveled portion 46 therebetween. Also an interior surface 48 of intermediate ring 40 generally follows the contours of the external surface. At least one, and preferably two or more, weepage ports 50 fluidly connect the interior surface 48 with the exterior of the intermediate ring 40. A lower surface 52 of the intermediate ring 40 is flat to conform to the upper surface 32 of the high pressure seal assembly 20. The brass intermediate ring 40 also includes a flat upper surface 54 that a lip 56 extending around the outer circumference thereof, the function of which will be explained below.

Figure 4:
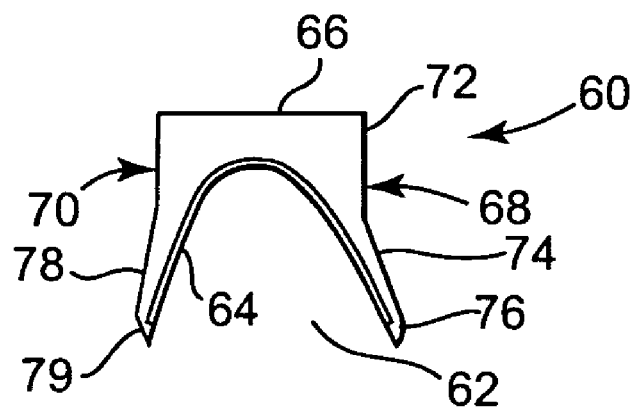

Referring now to FIG. 4 there is shown a cross section of the low pressure seal 60. Low pressure seal 60 is preferably constructed of a mixture of PTFE (Teflon) and graphite, as is the high pressure seal assembly 20. Also like the high pressure seal assembly 20, the low pressure seal 60 defines a female chevron structure 62 that includes an energizer spring 64. Energizer spring 64 is similar to that used in high pressure seal assembly 20, and is better seen in FIG. 4. The energizer spring 64 is preferably constructed of stainless steel more preferably 302 stainless steel and even more preferably a plurality of leaf springs. The leaf springs of the low pressure seal are preferably more robust than those of the high pressure seal, as the female chevron of the low pressure seal is larger than that of the high pressure seal. Also, the body of low pressure seal 60 is more pliable because it is smaller than that of the high pressure seal 20. Low pressure seal 60 has an upper surface 66, which is flat, an interior surface 68 and an exterior surface 70 (interior and exterior being relative to the cylindrical nature of low pressure seal 60). The interior surface 68 includes a flat upper portion 72 and a flanged portion 74. To provide sealing, flanged portion 74 includes a rounded seal surface 76 that acts against the plunger. The external surface 70 also includes a flanged portion 78 that preferably tapers in at the lower edge 79.

Referring now to FIG. 3 the low pressure seal retainer 80 is now described. The low pressure seal retainer 80 is preferably made of brass and includes an exterior surface 82 that defines a groove 84 for receiving an O-ring 86. The low pressure seal retainer 80 also defines a multi-faceted interior surface 88. The multi-faceted interior surface 88 includes a recess 90 at the lower edge of the retainer, the recess 90 being defined by a ledge 92 that extends inwardly to attain an interior diameter that is just slightly larger than the plunger to be received. In an upper end, the interior surface 88 includes a beveled portion 94 that expands at the upper end to more easily receive a plunger during assembly. The recess 90 is of a predetermined height sized to receive the low pressure seal 60 as well as the lip 56 of the brass intermediate ring 40. Recess 90 also has a width sized to receive the low pressure seal 60 in such a manner that the rounded seal surface 76 extends slightly past the interior surface 88 such that it may form a seal against the plunger.

Having discussed all of the components of the seal stack 10, its operation will now be discussed. In operation the seal stack 10 is assembled as is shown in FIG. 3 and placed in a cylinder block as shown in FIG. 2. Specifically, the lower edge 30 of the high pressure seal assembly is flush against a flat surface within the cylinder housing. A plunger is received by the concentric interior surfaces of the stack 10 and is oriented such that on a compressive downward stroke the plunger moves in a downward direction (again, relative to the orientation of components shown in the Figures). During a compressive stroke, the pressure of the incompressible water quickly rises and fills the chevron 34 of the high pressure seal assembly 20 causing the rounded ridge 38 to project inwardly pressing against the plunger, creating a "tighter" seal. Any water that seeps by this rounded ridge 38 will enter the weepage ports 50 and be directed back into the inlet. Inlet water will also accumulate in the female chevron 62 of the low pressure seal 60. This water pressure will cause the female chevron 62 to expand forcing the rounded edge 76 of the flanged portion 74 of the interior surface 68 to seal itself against the plunger. In order for water pressure to build more quickly some of the volume of the female chevron 62 is filled by the lip 56 of the brass intermediate ring 40. Once the plunger has reached dead bottom center the plunger starts back up towards top dead center, the pressure inside the cylinder quickly diminishes until a vacuum is achieved. The energizer springs 64 and 36 acts to retract their respective sealing surfaces, relieving friction between the sealed surface and the plunger thereby extending the life of the seal stack 10.

The invention has herein been described in its preferred embodiments to provide those skilled in the art with the information needed to apply the novel principles and to construct and use the embodiments of the examples as required. However, it is to be understood that the invention can be carried out by specifically different devices and that various modifications can be accomplished without departing from the scope of the invention itself, which is set out in the following claims:

What is claimed is:

1. A seal stack for use in conjunction with a reciprocating plunger which extends into a pump body, the pump body further having a recess configured to receive the seal stack, with the seal stack comprising:

a first cylindrical seal member having a ring shaped configuration designed to surround and be axially aligned with the plunger, the first cylindrical seal member having substantially planar upper and lower surfaces and substantially cylindrical inner and outer surfaces, wherein the inner and outer surfaces are aligned with a central cylindrical axis of the first seal member with the inner surface being in juxtaposition with the reciprocating plunger and the outer surface situated adjacent a surface of the pump body recess thereby forming a seals between the recess and the first cylindrical seal member, the upper and lower surfaces being substantially perpendicular to the central axis of the first cylindrical seal member, the first cylindrical seal member further including a sealing structure positioned at the point where the lower and inner surfaces meet, the sealing structure including a sealing lip extending inwardly from the inner surface and creating a chevron shaped recess opening in a direction toward the lower surface such that the inner portion of the chevron shaped recess is exposed and responsive to pressures generated within the pump body such that the pressure of the sealing lip of the sealing structure against the plunger increases when pressure in the pump body increases and decreases when pressure in the pump body decreases;

an intermediate ring axially aligned with the first cylindrical seal member and surrounding the plunger, the intermediate ring having a first inner cylindrical surface in substantial alignment with the inner surface of the first seal member and having a diameter substantially equal to that of the inner surface of the first cylindrical seal member, the intermediate ring having a second inner cylindrical surface having a diameter larger than the diameter of the first inner cylindrical surface with the second inner cylindrical surface adjacent to an upper portion of the intermediate ring, the intermediate ring also including a seating lip extending upwardly at an upper end of the second inner cylindrical surface, and a weepage port having an opening positioned proximate to the second inner cylindrical surface thus allowing an exit path for any liquid that may pass through the first seal member;

a cylindrical retainer coaxially aligned with and surrounding the plunger, the retainer positioned adjacent to and in contact with the intermediate ring and opposite the first seal member, the retainer having an inner cylindrical surface with a diameter slightly larger than the plunger and including a recess therein at a lower end of the retainer wherein the seating lip of the intermediate ring will be positioned within a portion of the recess;

a second seal member positioned substantially within the retainer recess, the second seal member having a first end and a second end with the first end being adjacent the upper surface of the recess and the second end being opposite the first end, the second end further having a chevron-shaped recess therein forming an inner flanged portion and an outer flanged portion, wherein the inner flanged portion is flexible and in contact with the plunger to form a seal therewith while the outer flange portion is seated upon the intermediate ring, the chevron-shaped recess being configured and aligned to be responsive to pressures generated within the pump body such that the pressure of the inner flanged portion against the plunger increases when pressure in the pump body increases and decreases when pressure in the pump body decreases, and wherein the second seal member is positioned within the recess to have the seating lip of the intermediate ring make contact with the outer flanged portion of the second seal member.

2. The seal stack of claim 1 wherein the first seal member further includes an energizer spring positioned within the chevron-shaped recess so as to bias the chevron shaped recess to a predetermined position.

3. The seal stack of claim 1 wherein the first seal member is retained within the recess in the pump body and includes an o-ring seal positioned within a recess in the outer surface.

4. The seal stack of claim 1 wherein the retainer is retained within the recess in the pump body and includes an o-ring seal positioned within a recess in an outer cylindrical surface of the retainer.

* * * * *